(12) United States Patent
Griffin et al.

(10) Patent No.: US 12,423,127 B2
(45) Date of Patent: Sep. 23, 2025

(54) INHERITANCE CONTAINER SERVICE

(71) Applicant: Red Hat, Inc., Raleigh, NC (US)

(72) Inventors: Leigh Griffin, Waterford (IE); Pierre-Yves Chibon, Saint-Pol-de-Leon (FR)

(73) Assignee: Red Hat, Inc., Raleigh, NC (US)

( * ) Notice: Subject to any disclaimer, the term of this patent is extended or adjusted under 35 U.S.C. 154(b) by 531 days.

(21) Appl. No.: 17/752,395

(22) Filed: May 24, 2022

(65) Prior Publication Data
US 2023/0385090 A1    Nov. 30, 2023

(51) Int. Cl.
*G06F 3/00* (2006.01)
*G06F 8/61* (2018.01)
*G06F 9/455* (2018.01)
*G06F 21/60* (2013.01)

(52) U.S. Cl.
CPC .......... *G06F 9/45558* (2013.01); *G06F 8/63* (2013.01); *G06F 21/606* (2013.01); *G06F 2009/45562* (2013.01); *G06F 2009/4557* (2013.01); *G06F 2009/45579* (2013.01); *G06F 2009/45587* (2013.01); *G06F 2009/45595* (2013.01)

(58) Field of Classification Search
CPC ....................................................... G06F 9/50
See application file for complete search history.

(56) References Cited

U.S. PATENT DOCUMENTS

| | | | | |
|---|---|---|---|---|
| 5,873,097 | A  * | 2/1999 | Harris | G06F 16/2308 |
| | | | | 707/999.203 |
| 8,181,182 | B1 * | 5/2012 | Martin | G06F 9/485 |
| | | | | 718/104 |
| 8,402,061 | B1 * | 3/2013 | Briggs | G06F 16/25 |
| | | | | 707/706 |
| 9,830,192 | B1 * | 11/2017 | Crouchman | G06Q 30/0601 |
| 9,983,891 | B1 * | 5/2018 | Christensen | G06F 8/63 |
| 10,089,476 | B1 * | 10/2018 | Roth | G06Q 20/14 |
| 10,901,700 | B2 | 1/2021 | Wang et al. | |
| 11,029,976 | B2 | 6/2021 | Wong et al. | |
| 2007/0260971 | A1* | 11/2007 | Rivas | G06F 40/131 |
| 2009/0182979 | A1* | 7/2009 | Farrell | G06F 9/45558 |
| | | | | 718/1 |
| 2013/0262522 | A1* | 10/2013 | van Rotterdam | G06F 16/211 |
| | | | | 707/802 |

(Continued)

FOREIGN PATENT DOCUMENTS

| | | | |
|---|---|---|---|
| CN | 108733446 | A  * | 11/2018 |
| CN | 109165082 | | 1/2019 |

(Continued)

OTHER PUBLICATIONS

Paul B. Menage, Adding Generic Process Containers to the Linux Kernel. (Year: 2007).*

(Continued)

*Primary Examiner* — Lechi Truong
(74) *Attorney, Agent, or Firm* — Womble Bond Dickinson (US) LLP

(57) ABSTRACT

Processing logic may provide a first container having a first software version. Processing logic may create a second container having a second software version within the first container. Processing logic may replace the first container with the second container, in response to testing of the second container satisfying one or more criteria.

16 Claims, 5 Drawing Sheets

(56) References Cited

U.S. PATENT DOCUMENTS

| | | | |
|---|---|---|---|
| 2015/0205977 A1* | 7/2015 | Rundle | G06F 21/6227 |
| | | | 707/781 |
| 2016/0065618 A1* | 3/2016 | Banerjee | G06F 9/455 |
| | | | 726/1 |
| 2016/0301676 A1* | 10/2016 | Gounares | H04L 63/0428 |
| 2017/0161205 A1* | 6/2017 | Leggette | G06F 11/1076 |
| 2017/0269978 A1* | 9/2017 | Engel | G06F 9/541 |
| 2018/0123863 A1* | 5/2018 | Sharma | H04L 41/082 |
| 2018/0285203 A1* | 10/2018 | Cox | G06F 11/1461 |
| 2018/0357068 A1* | 12/2018 | Ambichl | G06F 9/545 |
| 2020/0387599 A1* | 12/2020 | Du | G06N 5/04 |
| 2021/0146950 A1 | 5/2021 | Lee et al. | |
| 2021/0319360 A1* | 10/2021 | Vishnoi | H04L 51/02 |
| 2022/0012137 A1* | 1/2022 | Xiao | G06F 9/44505 |

FOREIGN PATENT DOCUMENTS

| | | |
|---|---|---|
| CN | 111880816 | 11/2020 |
| CN | 111290767 | 8/2021 |
| GB | 201608291 A * | 11/2017 |
| WO | 2021167507 | 8/2021 |

OTHER PUBLICATIONS

Ottawa, Proceedings of the Linux Symposium. (Year: 2007).*

Oussama Smimite, Containers Placement and Migration on Cloud System, (Year: 2020).*

Lu, Zhigang, et al., "An acceleration method for docker image update," 2019 IEEE International Conference on Fog Computing (ICFC), 2019, pp. 15-23.

Frankel, Nicolas, "Composition over inheritance applied to Docker," retrieved from the Internet <https://blog.frankel.ch/composition-over-inheritance-applied-docker/>, Nov. 17, 2019, 8 pages.

* cited by examiner

INHERITANCE CONTAINER SERVICE

TECHNICAL FIELD

Aspects of the present disclosure relate to container services, and more particularly, to performing a software update of a container service based on an inheritance model.

BACKGROUND

Computing devices may execute instructions that are grouped together as a computer program to perform one or more related actions. Computing devices may be communicatively coupled to each other over a network, which may include electrical or optical wiring, wireless radio-frequency transceivers, or other network infrastructure. The computing devices may communicate with each other over the network, using various communication protocols.

Developers may update existing software for a variety of reasons such as, for example, to add new functionality, address security concerns, fix bugs, or a combination thereof. An update to an existing software application may be tracked with a version number (e.g., version 1.0.1), to keep a history of changes to the software. For example, when a developer creates an update for a given software product, the developer may assign a new version number (e.g., 1.0.2) to the new software version. Deployment is the mechanism through which applications, modules, software updates or patches are made operational on a target device or platform. Various strategies may be used to deploy a new software version.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
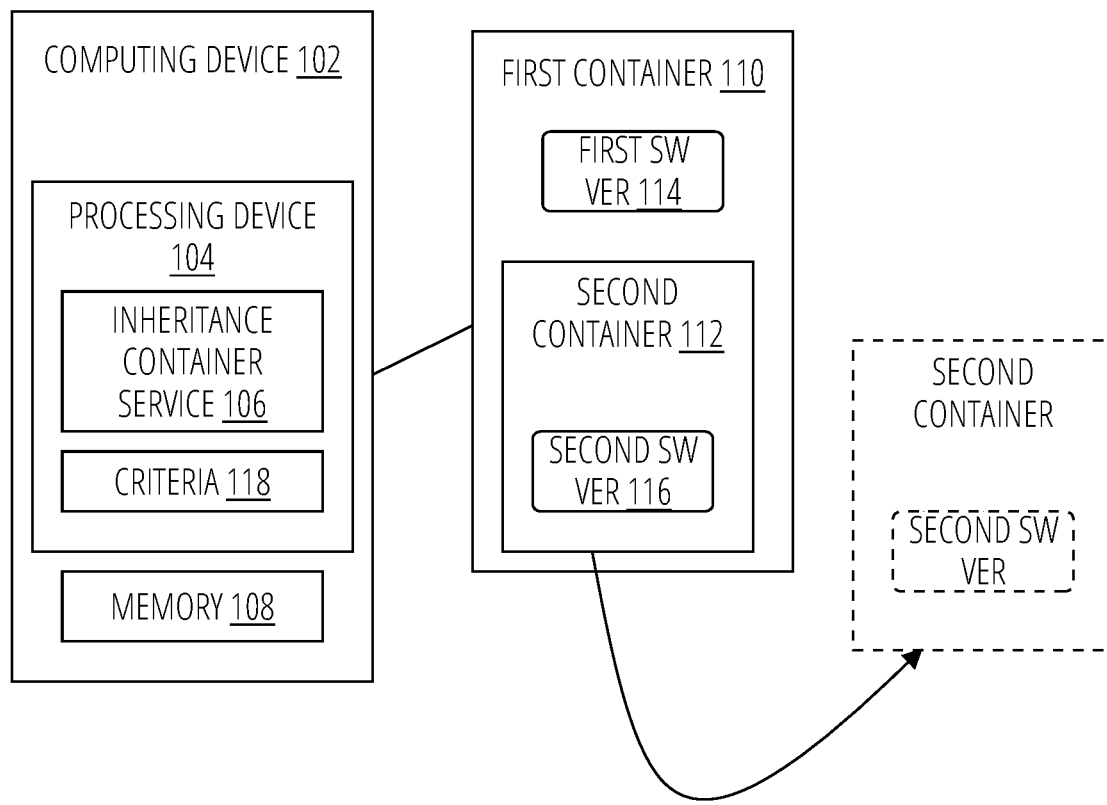
FIG. 1 shows a block diagram of an example computing device that may perform an update to a service using an inheritance based model, in accordance with some embodiments.

Data can be stored on servers which can be cloud-based and/or reside in a local network. Applications are run on servers to manage the data for a variety of computing needs. Clients may access data and functionality of servers over a network.

A monolithic software architecture is characterized by software that is built and run as a single application. Application functionality with monolithic software architecture is unified and managed and served from a single application base. Monolithic applications lack modularity—they have a single large code base and cannot be operated on or upgraded in a modular fashion.

Virtual machines (VMs) allow internet providers to run multiple operating system instances on a common server. With VMs, applications can be isolated from each other in the same server, thus reducing the need for buying or maintaining multiple servers. VMs, however, can consume system resources because they make virtual copies of resources such as operating systems, etc. For servers to run VMs, a substantial amount of RAM, clock time, and operating system licenses may be required.

Containers support virtualization of multiple applications, during runtime, while using a common OS instance. A single container can have dedicated resources such as its own file system, RAM, CPU, storage, and access to specified system resources. Containers can include packages of application-specific software that include everything that it needs to run, including code, dependencies, libraries, binaries, and more. Compared to VMs, multiple containers can share a single operating system kernel instead of having a full copy of an OS kernel per instance of VM. As such, containers can take up less resources and be more portable than a traditional VM architecture. A service or microservices can be grouped in a container and use those dedicated resources of the container.

Platforms for containerized applications help to manage containerized workloads and services. A container management environment, such as, for example, Kubernetes may facilitate both declarative configuration and automation. A container management environment can include a set of building blocks ("primitives"), which collectively provide mechanisms that deploy, maintain, and scale applications based on CPU, memory, or custom metrics. Such a container management environment can be extensible to meet different workloads. For example, the container management environment can include an application programming interface (API), that may be used by internal components as well as extensions and containers that run on the platform. The container management environment may control compute and storage resources by defining resources as Objects, which can then be managed as such.

In conventional systems, deployment strategies may be employed for containers to maintain uptime and continuity of a service. For example, a deployment strategy may use an A/B approach that uses two copies of the service (and thus, two containers), a copy A and a copy B, to seamlessly update a software version. Under an A/B approach, a container may be updated to a new version while still maintaining continuity and providing the underlying service to clients. Such an approach, however, presents a challenge because both copies of the service are to be monitored and updated. Further, a container management environment is to support traffic routing and data synchronization for both two copies, thereby increasing the workload and complexity of managing the containers. Further, performing traffic routing and data synchronization across a container boundary may present security challenges and may need a full orchestration level of service to manage the routing and data synchronization.

Aspects of the disclosure address the above-noted issues and other deficiencies by processing logic that may update a software version of a container in a manner that maintains continuity and access to the underlying service of the container without creating additional traffic routing and data synchronization within the container management environment. To update the software of a container (e.g., from a first version to a second version), processing logic may generate an image of a second container with the second version, and provide this image to the container. The container may instantiate the second container within itself (e.g., as a nested container), and transfer functionality to the second container. Testing of the second container may be performed through the first container. For example, clients which may be other containers, may communicate with the first container without replicating additional data or network traffic. The first container may pass these client requests to the second container to gain confidence in the second container. If the second container passes one or more criteria, the second container may be instantiated outside of the first container and the first container may be destroyed.

In such a manner, processing logic may facilitate a software update of a container while keeping data replication and network management to a minimum. Processing logic may perform the operations automatically (e.g., without input from a human). For example, processing logic may monitor the first container and identify when the first container has an update available. Processing logic may monitor a common vulnerabilities and exposures (CVE) feed or layer updates to determine if a new software update is available for the first container. If available, processing logic may perform the operations described for standing up the second container.

In one aspect, processing logic may provide a first container having a first software version. Processing logic may create a second container having a second software version within the first container. Processing logic may replace the first container with the second container, in response to testing of the second container satisfying one or more criteria. The first container and second container may be provided in a container management environment.

In some examples, creating the second container within the first container includes creating and passing an image file of the second container to the first container to cause the first container to create the second container within the first container.

In some examples, testing of the second container includes causing the first container to pass a network request received from a client to the second container within the first container, for the second container to process the network request. In some examples, testing of the second container includes transferring data ownership from the first container to the second container. In some examples, testing of the second container includes transferring network ownership from the first container to the second container. In some examples, testing of the second container includes transferring a cryptographic key, a security token, or a data lock from the first container to the second container.

In some examples, replacing the first container with the second container includes rebuilding the second container outside of the first container within the container management environment and removing the first container from the container management environment. The second container may be rebuilt outside of the first container and with ownership of resources (e.g., data and network ownership) that is inherited from the first container.

In some examples, the one or more criteria includes a threshold rate or number of network requests handled successfully by the second container. Additionally, or alternatively, the one or more criteria may include successful access of data or other resource. The test criteria may be defined and programmed into processing logic by a user with domain knowledge of the software update to the container. Such a user may have knowledge of what has changed or what bug fixes are implemented in the new version, and may set the criteria to test changes, fixes, or other new or changed features of the software.

Processing logic may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. Processing logic may perform server-side operations of a recommendation service or client-side operations of selecting and performing a software update, or both.

FIG. 1 shows a block diagram of an example computing device 102 that may perform an update to a service using an inheritance based model, in accordance with some embodiments.

Computing device 102 includes a processing device 104 and a memory 108. Memory 108 may include volatile memory devices (e.g., random access memory (RAM)), non-volatile memory devices (e.g., flash memory) and/or other types of memory devices. Computing device 102 may include processing logic such as processing device 104.

Processing device 104 includes an inheritance container service 106. The inheritance container service 106 may comprise one or more computer applications that run on processing device 104 to perform operations described herein.

The computing device 102 and a first container 110 may operate within a container management environment. A container management environment may include software and hardware that creates, manages and secures containerized applications (such as first container 110). A container management environment may include container engines (e.g., Docker), which provide a container runtime environment, supports the creation of containers, manages container images, and performs basic container operations. Additionally, or alternatively, the container management environment may include container orchestrators (e.g., Kubernetes) which support management, governance, and automation of containers at scale. Additionally, or alternatively, the container management environment may include a managed container platform (e.g., Google Kubernetes Engine), which may augment the container engine and container orchestrator with additional services.

First container 110 may include packages of application-specific software that include everything that it needs to run, including code, dependencies, libraries, binaries, and more. The software may provide the functionality of the underlying service of a container. Containers can share a single operating system kernel instead of having a full copy of an OS kernel per instance of a VM. A plurality of containers may form a pod which may run on a node. As such, a container such as container 110 may reside on a node which may be deployed as a physical or virtual machine. The container management environment may include a cluster, which is formed from a plurality of nodes that interact with a control plane. The control plane may schedule cluster activity and registers and responds to cluster events. Processing device 104 may direct activity within the container management environment using a container engine, container orchestrators, a managed container platform, or other components of a container management environment.

The processing device 104 may provide a first container 110 having a first software version 114 in the container management environment. For example, the processing device may create the first container 110 or deploy the first container 110 to the container management environment. The first container 110 may include a software package with first software version 114 that dictates how the underlying service of the first container 110 behaves. For example, the software package may determine how the service responds to various requests (e.g., from clients), how to perform logic or tasks, how the container reads, writes, or analyzes data, or other application-specific behavior. A software version identifies a specific version of a given software application that may be expressed as one or more symbols (e.g., a number, letters, etc.) such as '1.1.0', '1.1.1', etc.

Processing device 104 may create a second container 112 having a second software version 116 within the first container. For example, the processing device may create and pass an image file (e.g., a Docker container image file) of the second container to the first container to cause the first container to create the second container within the first container. In some example, the processing device may obtain a specification file (e.g., from a container registry) for the second container to create the image file of the second container. The specification file of a container may serve as a source code of a container. It may describe the containers lifecycle, responsibilities, and actions, etc.

Processing device 104 may replace the first container 110 with the second container 112, in response to testing of the second container 112 satisfying one or more criteria 118. The first container 110 may pass ownership of resources to the second container 112 while the second container 112 is within the first container 110. Testing of the second container may be done through the first container 110. In such a manner, the second container 112 may be verified without additional traffic routing and data synchronization as would be the case if the second container 112 was tested in parallel with operation of the first container 110.

From outside of the first container 110, clients (which may include other containers) may seamlessly communicate with the first container 110 oblivious as to whether the second container 112 is performing the requested functionality. Additional traffic routing and data synchronization is not needed, and data replication and network management is reduced.

In some examples, the second container 112 may satisfy the one or more criteria in a staging or testing environment. In such a case, the first container 110 may simply pass ownership to the second container 112 and processing device 104 may replace the first container 110 with the second container 112.

In some examples, testing of the second container 112 includes causing the first container 110 to pass a network request received from a client to the second container 112 within the first container 110, for the second container 112 to process the network request. The one or more criteria 118 may include a threshold rate (e.g., 'x' %) or number (e.g., 'N' number of requests) of network requests handled successfully by the second container 112.

Processing device 104 may delegate down resources from the first container 110 to the second container 112. For example, processing device 104 may transfer data ownership from the first container 110 to the second container 112. For example, first container 110 may manage a database that the first container 110 stores data to and/or reads data from, to service client requests. The first container 110 may pass ownership of the database to the second container 112 so that the second container 112 accesses the database to service the client request.

Similarly, processing device 104 may transfer network ownership from the first container 110 to the second container 112. For example, clients (e.g., other containers or services) may communicate with first container 110 (e.g., by sending a request). The first container may receive the communication and send the request down to the second container 112 but still within the first container 110 (e.g., without creating traffic outside of the first container 110). The second container 112 may handle the request, and then send a response to the client through the first container 110. The first container 110 may transfer ownership of the network to the second container 112 so that requests are given directly to the second container 112 while it is within the first container 110.

In some aspects, processing device 104 may transfer security devices (e.g., a cryptographic key, a security token, or a data lock) or administrative privileges from the first container 110 to the second container 112, to access resources (e.g., data or the network). The one or more criteria 118 may include verifying that the second container 112 may successfully access the resources.

In some examples, testing may include delegating and testing resources in a staggered manner. For example, the first container 110 may transfer ownership of a first resource, test it, then transfer ownership of a second resource, test it, and so on, until the first container 110 has delegated its core resources to the second container 112 such as, for example, data ownership, network ownership, and security or administrative components needed to access the data and network.

Processing device 104 may rebuild the second container 112 outside of the first container 110 (e.g., within the container management environment) and remove the first container 110 from the container management environment, to replace the first container 110 with the second container 112. The second container 112 may be rebuilt outside of the first container 110 with ownership of resources (e.g., data and network) that is inherited from the first container 110. The second container 112 may retain its ownership of resources, which is passed down to it during its time in the first container 110, e.g., through its specification file.

Computing device 102 and first container 110 and second container 112 may be communicatively coupled to a computer network. In some examples, computing device 102 may include a plurality of computing devices. The first container 110 and second container 112 may reside on the same or different computing device as processing device 104. In some examples, inheritance container service 106 may be a service running on its own container (e.g., within the container management environment).

Figure 2:
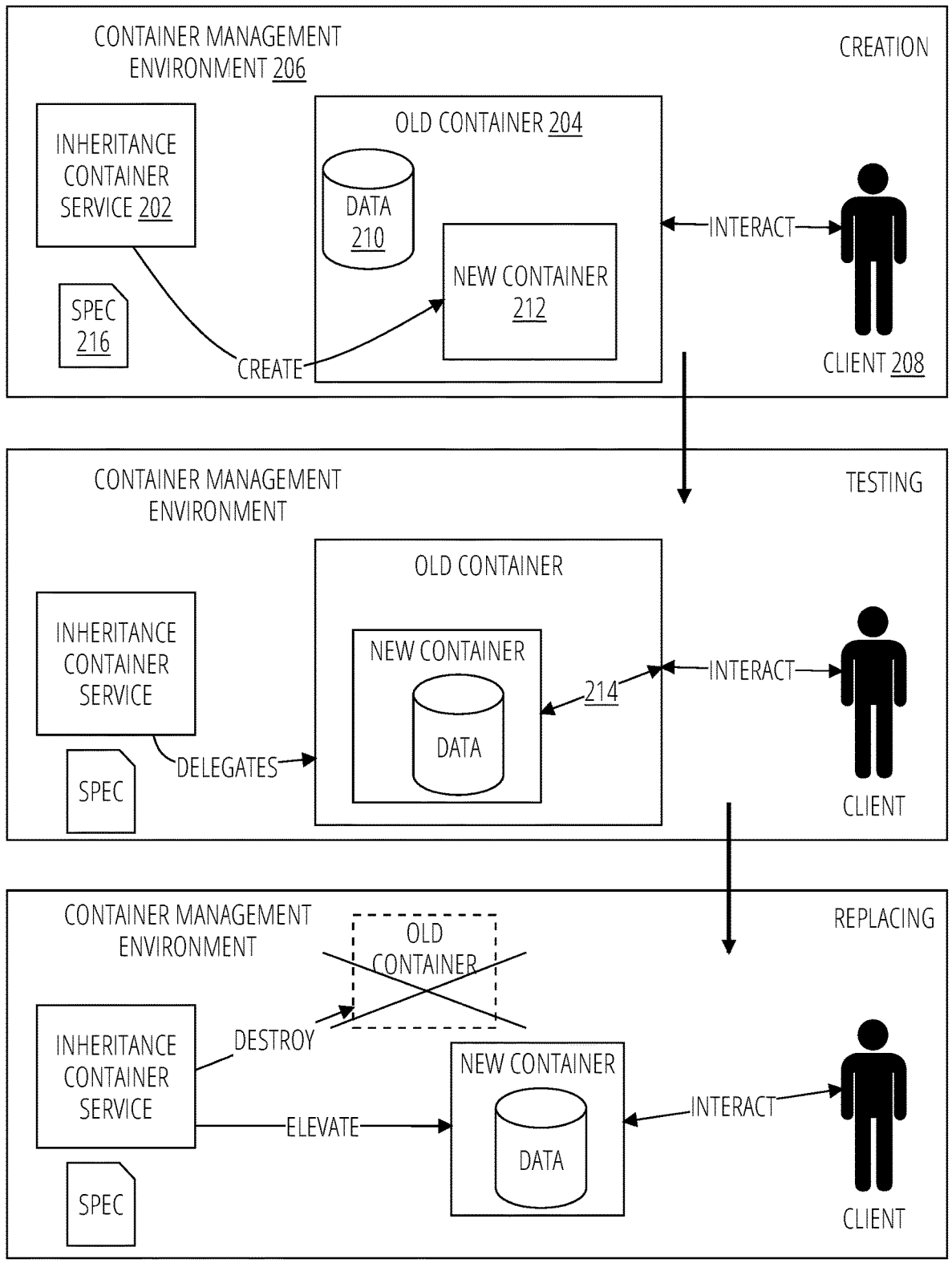
FIG. 2 shows an example workflow for updating software for a container-based service, in accordance with some embodiments.

FIG. 2 shows an example workflow for updating software for a container-based service, in accordance with some embodiments. Processing logic may perform operations related to container management environment 206, the inheritance container service 202, the containers 204, 212, or client 208.

Processing logic may update software for a container-based service as shown in FIG. 2 three stages; creating a new container (with a new version of software) within an old container (with a prior version of software), testing the new container within the old container, and replacing the old container with the new container. The functionality of the service provided by the old container may be updated to that of the new container in a seamless manner.

A container management environment 206 may provide or support operation of a container 204 (e.g., an old container) running an old software version. As described, a container management environment 206 may include hardware and software components that support one or more containers and communication between the containers. Client 208 may be another container, a service, or other client that may reside within the container management environment 206 or outside of the environment.

An inheritance container service 202 may operate within the container management environment 206 to monitor containers to determine if an update is being pushed to a given container. For example, inheritance container service 202 may determine that a new version is being pushed to update software for old container 204. The new version of software may be an update or patch to the old version. The new version may provide additional or changed functionality, address bugs, or both.

In the creation stage, the inheritance container service 202 may create a new container 212 having a new software version by creating an image (e.g., a Docker container image) of the new container 212. The image may be a lightweight, standalone, executable package of software that includes everything needed to run an application: code, runtime, system tools, system libraries and settings. In some examples, the image may be created by obtaining a specification file 216 that characterizes behavior and other characteristics of the new container 212. The inheritance container service 202 may pass this image to the old container 204 which causes the new container 212 to be created within the old container 204. The new container 212 may be confined to the resources (e.g., compute, data, and network resources) of the old container 204.

In the testing phase, the inheritance container service 202 may delegate resources of the old container 204 to the new container 212. For example, inheritance container service 202 may cause the old container 204 to transfer ownership of data 210 to the new container 212. Data may include a database and/or access to the database. The old container 204 may then handle requests (e.g., from a client 208), which may be passed within the old container 204 from the old container 204 to the new container 212. The inheritance container service 202 may monitor the behavior of the new container 212 and data traffic to determine whether the new container 212 is accessing the data successfully and handling the requests as expected.

For example, at operation 214, the old container 204 may pass a network request from a client 208 to the new container 212, so that the new container 212 may handle the request from the client 208. The new container 212 may access data 210 and provide a response based on the data 210 to the client. Until the old container 204 transfers ownership of the network to the new container 212, the old container may relay communication back and forth between the client 208 and new container.

Further, when confidence in the new container 212 is established, the inheritance container service 202 may cause the old container to transfer ownership of the network to allow the new container 212 to communicate and interact with the client 208. As described, the old container 204 may also pass administrative rights, a data lock, security keys (e.g., a key of a cryptographic key pair), or other components that the new container 212 may need to access the delegated resources.

The process may transition to the replacing phase when one or more criteria are satisfied. For example, processing logic may replace the old container 204 with the new container 212 when all tests have passed, or if the new container successfully access all resources, or if the client requests are being handled as expected, or a combination of these or other criteria.

In the replacing phase, the inheritance container service 202 may replace the new container 212 with the old container 204 in the container management environment 206. By doing so, the old software of the old container 204 is replaced with the new software of the new container 212, thereby upgrading the software.

In some examples, once all resources (or core resources) are transferred from the old container to the new container, the inheritance container service 202 may rebuild the new container 212 outside of the old container 204 within the container management environment 206. The old container 204 is merely a shell at this phase. The inheritance container service 202 may remove the old container 204 from the container management environment 206. The new container 212 may be rebuilt with ownership of resources (e.g., the data and network) that is inherited from the first container. This ownership may be retained by the new container 212 through the specification file 216. The rebuilding of the new container 212 and discarding of the old container 204 may be performed simultaneously, in a seamless manner that reduces downtime of the service.

The inheritance container service 202 may delegate resources, rebuild a container, destroy a container, or perform other actions using components of the container management environment 206, for example, by configuring a respective specification file 216 of the new container 212 or the old container 204.

Figure 3:
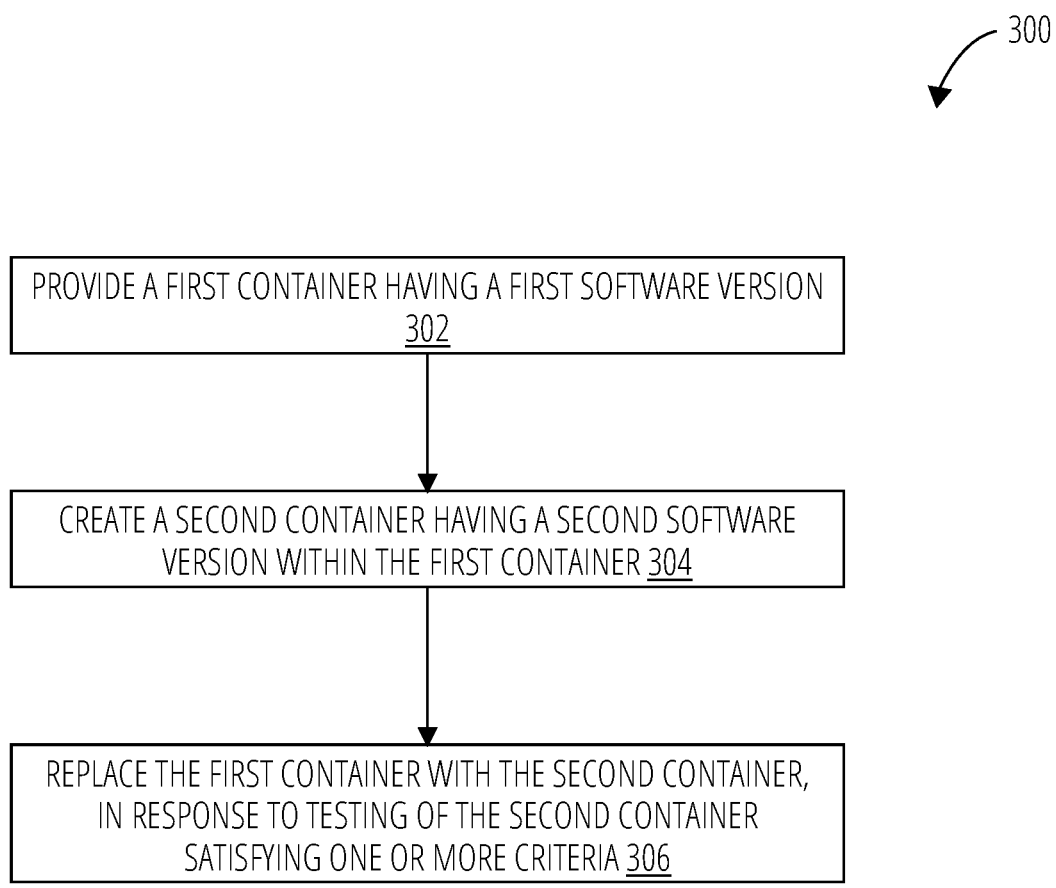
FIG. 3 illustrates an example of a method for updating software for a container-based service, in accordance with some embodiments.

FIG. 3 illustrates an example of a method for updating software for a container-based service, in accordance with some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

With reference to FIG. 3, method 300 illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in method 300 may be performed in an order different than presented, and that not all of the blocks in the method may be performed.

At block 302, processing logic may provide a first container having a first software version. The first software version may be understood as the old or prior version of the software that performs functionality (e.g., business logic) provided by the first container.

At block 304, processing logic may create a second container having a second software version within the first container. The second software version may be understood as new software version, which may be an update to the first software version.

At block 306, processing logic may replace the first container with the second container, in response to testing of the second container satisfying one or more criteria. As described, processing logic may leverage the container management environment that supports the containers to perform the operations described. In some examples, the method may be performed in response to determining that an update to the first software version is available, as described in other sections.

Figure 4:
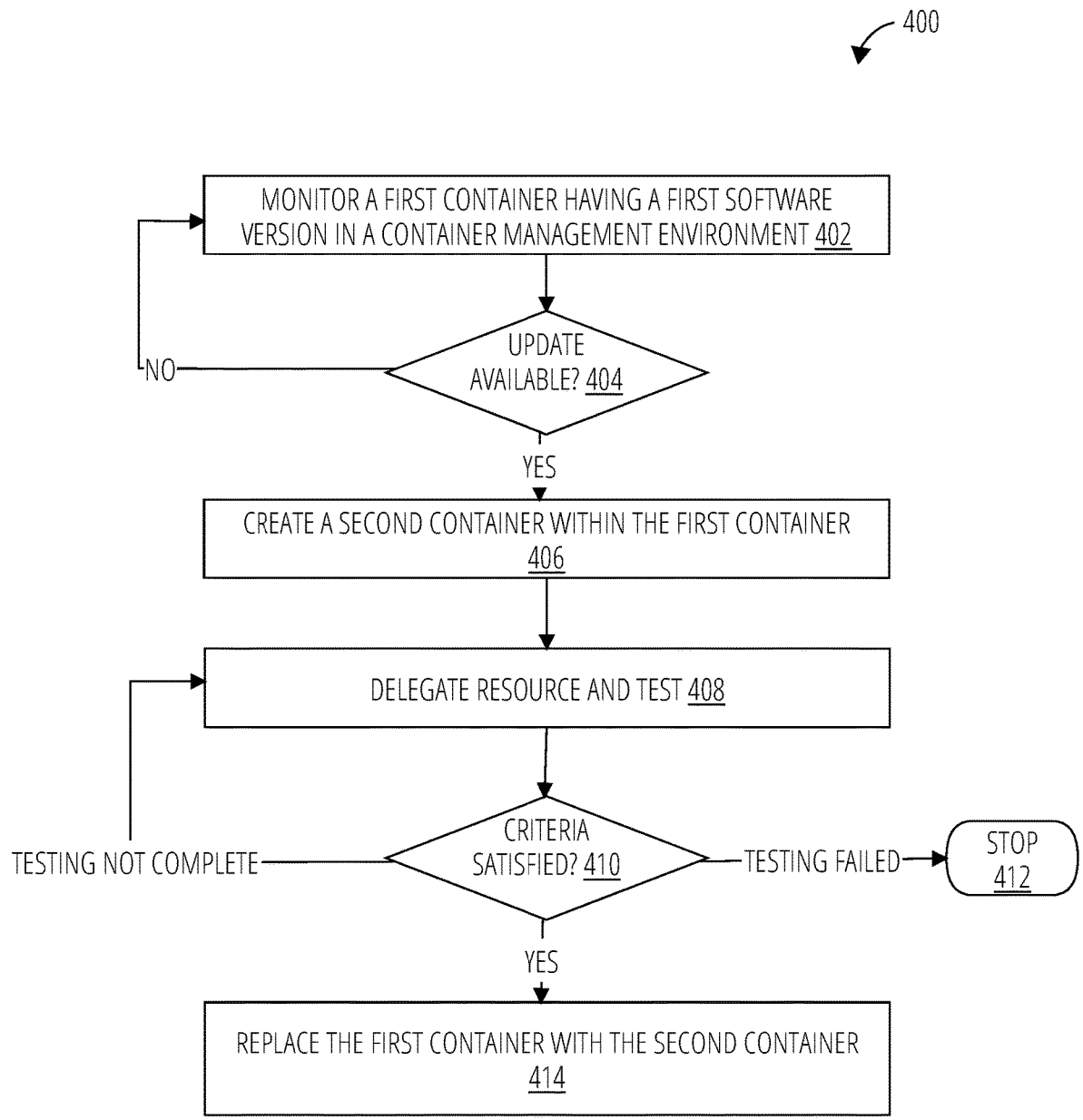
FIG. 4 illustrates an example of a method for monitoring and updating software for a container-based service, in accordance with some embodiments.

FIG. 4 illustrates an example of a method for monitoring and updating software for a container-based service, in accordance with some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

With reference to FIG. 4, method 400 illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in method 400 may be performed in an order different than presented, and that not all of the blocks in the method may be performed.

At block 402, processing logic (e.g., an inheritance container service) may monitor a first container having a first software version in a container management environment.

At decision block 404, processing logic may determine whether there is a software update available for the first software version. For example, processing logic may scan data such as a CVE or layer updates to determine if a new software version is ready. Additionally, or alternatively, an administrator may provide input that a software update is ready for the first software version and processing logic may take this as a signal that an update is available. If a software update is available, processing logic may proceed to block 406. Otherwise, processing logic may continue to monitor for the containers at block 402.

At block 406, processing logic may create a second container within the first container. The second container may be held in the first container such that it is not visible to other services (e.g., clients or other containers) and does not need additional data routing, as described in other sections.

At block 408, processing logic may delegate resources (e.g., data ownership, network ownership, or other resources) from the first container to the second container and test the second container to verify that the new software functions as intended. As described, processing logic may monitor and test that the second container handles client requests, properly accesses data, properly accesses the network, and otherwise functions as intended. Processing logic may test for bugs as well. The testing may be performed through interacting with the first container, so that the container management environment need not put forth additional resources towards network management and data replication (e.g., to support a second container in parallel with the first container).

At decision block 410, if one or more criteria are satisfied, processing logic may proceed to block 414 and replace the first container with the second container. The criteria may include one or more tests and expected test results that may be programmed or defined by an administrator and accessed by processing logic. As described, delegation and testing may be done in an incremental manner. For example, a first resource may be delegated and tested. Once that passes, a second resource may be delegated and tested, and so on.

If testing is not complete (e.g., more tests need to be performed and/or additional resources need to be delegated), then processing logic may delegate additional resources and/or perform additional testing at block 408, until all the criteria are satisfied. If testing has failed, processing logic may proceed to done block 412.

At done block 412, processing logic may transfer resources from the second container back to the first container, and remove the second container from the first container, thereby returning the first container to its initial state. Further, processing logic may store the results of the test in a log (e.g., an error log) or alert an administrator that the update was not successful.

In some embodiments, processing logic may skip the testing and verification stage. For example, if an update has been pre-tested in a test or staging environment or has otherwise provided confidence that it will behave as intended (e.g., the update is simple) then processing logic may bypass the testing and verification and simply delegate the resources and then replace the first container with the second container.

Figure 5:
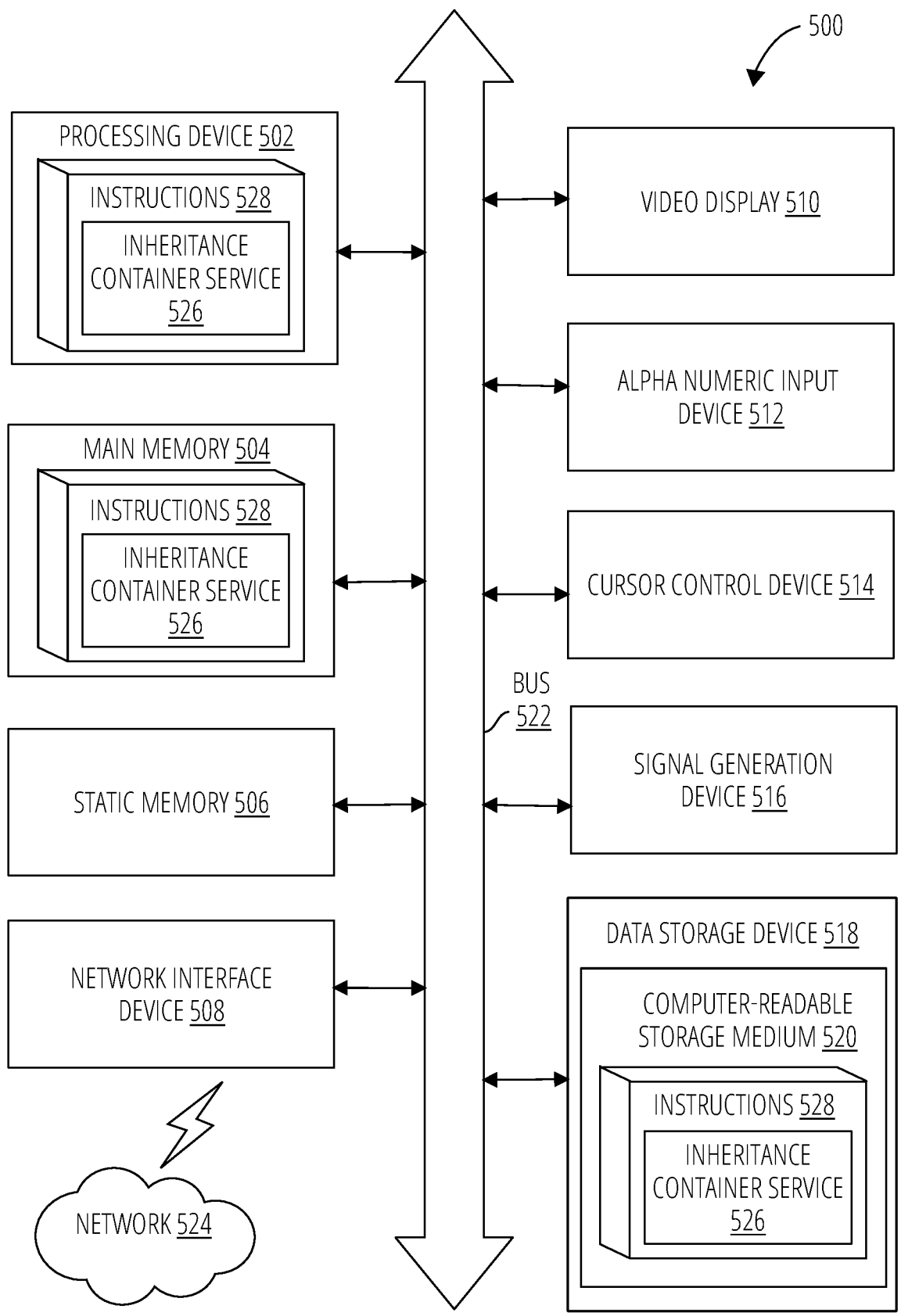
FIG. 5 is a block diagram of an example computing device that may perform one or more of the operations described herein, in accordance with some embodiments.

FIG. 5 is a block diagram of an example computing device 500 that may perform one or more of the operations described herein, in accordance with some embodiments. For example, the computing device 500 may update software for a container using a nested-container model, as described in other sections.

Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device 502 (e.g., a general purpose processor, a PLD, etc.), a main memory 504 (e.g., synchronous dynamic random access memory (DRAM), read-only memory (ROM)), a static memory 506 (e.g., flash memory and a data storage device 518), which may communicate with each other via a bus 522.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 524. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 520 on which may be stored one or more sets of instructions 528 that may include instructions for a processing device (e.g., processing device 104), for carrying out the operations described herein, in accordance with one or more aspects of the present disclosure. Instructions 528 may also reside, completely or at least partially, within main memory 504 and/or within processing device 502 during execution thereof by computing device 500, main memory 504 and processing device 502 also constituting computer-readable media. The instructions 528 may further be transmitted or received over a network 524 via network interface device 508. The instructions 528 may contain instructions of an inheritance container service 526 that, when executed, perform the operations and steps discussed herein.

While computer-readable storage medium 520 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "sending", "storing", "obtaining", "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component may be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 110, sixth paragraph, for that unit/circuit/component. Additionally, "configured to" or "configurable to" may include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
providing a first container including a software package having a first version;
determining that a second version of the software package is available;
creating, by a processing device and in response to determining that the second version of the software package is available, a second container including the software package having the second version, the second container being created within the first container; and
replacing the first container with the second container, in response to testing of the second container satisfying one or more criteria,
wherein replacing the first container with the second container includes rebuilding the second container outside of the first container within a container management environment and removing the first container from the container management environment, and
wherein the second container is rebuilt outside of the first container with ownership of data and ownership of network that is inherited from the first container.

2. The method of claim 1, wherein creating the second container includes creating and passing an image file of the second container to the first container to cause the first container to create the second container within the first container.

3. The method of claim 1, wherein the testing of the second container includes causing the first container to pass a network request received from a client to the second container within the first container, for the second container to process the network request.

4. The method of claim 1, wherein the testing of the second container includes transferring data ownership from the first container to the second container.

5. The method of claim 1, wherein the testing of the second container includes transferring network ownership from the first container to the second container.

6. The method of claim 1, wherein the testing of the second container includes transferring a cryptographic key, a security token, or a data lock from the first container to the second container.

7. The method of claim 1, wherein the one or more criteria includes a threshold rate or number of network requests handled successfully by the second container.

8. The method of claim 1, wherein the one or more criteria includes successful access of data or other resource.

9. A system comprising:
a memory; and
a processing device operatively coupled to the memory, the processing device to:
provide a first container including a software package having a first version;
determine that a second version of the software package is available;
create, by the processing device and in response to determining that the second version of the software package is available, a second container including the software package having a second version, the second container being created within the first container; and
replace the first container with the second container, in response to testing of the second container satisfying one or more criteria,
wherein, to replace the first container with the second container, the processing device is to rebuild the second container outside of the first container within a container management environment and remove the first container from the container management environment, and
wherein the second container is rebuilt outside of the first container with ownership of data and ownership of network that is inherited from the first container.

10. The computing apparatus of claim 9, wherein, to create the second container, the processing device is to create and pass an image file of the second container to the first container to cause the first container to create the second container within the first container.

11. The computing apparatus of claim 9, wherein the testing of the second container includes causing the first container to pass a network request received from a client to the second container within the first container, for the second container to process the network request.

12. The computing apparatus of claim 9, wherein the testing of the second container includes transferring data ownership from the first container to the second container.

13. The computing apparatus of claim 9, wherein the testing of the second container includes transferring network ownership from the first container to the second container.

14. A non-transitory computer-readable storage medium including instructions that, when executed by a processing device, cause the processing device to:
provide a first container including a software package having a first version;
determine that a second version of the software package is available;
create, by the processing device and in response to determining that the second version of the software package is available, a second container including the software package having a second version, the second container being created within the first container; and
replace the first container with the second container, in response to testing of the second container satisfying one or more criteria,
wherein, to replace the first container with the second container, the instructions cause the processing device to rebuild the second container outside of the first container within a container management environment and remove the first container from the container management environment, and
wherein the second container is rebuilt outside of the first container with ownership of data and ownership of network that is inherited from the first container.

15. The computer-readable storage medium of claim 14, wherein the testing of the second container includes transferring a cryptographic key, a security token, or a data lock from the first container to the second container.

16. The computer-readable storage medium of claim 14, wherein the one or more criteria includes a threshold rate or number of network requests handled successfully by the second container.

* * * * *